United States Patent
Senzaki et al.

(10) Patent No.: US 11,066,531 B2
(45) Date of Patent: Jul. 20, 2021

(54) SURFACE TREATMENT LIQUID AND HYDROPHILIC TREATMENT METHOD

(71) Applicant: Tokyo Ohka Kogyo Co., Ltd., Kanagawa (JP)

(72) Inventors: Takahiro Senzaki, Kanagawa (JP); Takashi Kamizono, Kanagawa (JP)

(73) Assignee: TOKYO OHKA KOGYO CO., LTD., Kanagawa (JP)

( * ) Notice: Subject to any disclaimer, the term of this patent is extended or adjusted under 35 U.S.C. 154(b) by 39 days.

(21) Appl. No.: 16/503,772

(22) Filed: Jul. 5, 2019

(65) Prior Publication Data

US 2020/0017652 A1    Jan. 16, 2020

(30) Foreign Application Priority Data

Jul. 10, 2018 (JP) .............................. JP2018-131059

(51) Int. Cl.
| | | |
|---|---|---|
| *B05D 3/00* | (2006.01) | |
| *C08J 7/16* | (2006.01) | |
| *B05D 5/00* | (2006.01) | |
| *C08F 20/28* | (2006.01) | |
| *C08F 20/34* | (2006.01) | |
| *C08F 20/38* | (2006.01) | |
| *C08F 20/60* | (2006.01) | |
| *C08J 7/14* | (2006.01) | |
| *C08K 5/23* | (2006.01) | |
| *C08K 5/3445* | (2006.01) | |

(52) U.S. Cl.
CPC ................ *C08J 7/16* (2013.01); *B05D 3/007* (2013.01); *B05D 5/00* (2013.01); *C08F 20/28* (2013.01); *C08F 20/34* (2013.01); *C08F 20/38* (2013.01); *C08F 20/60* (2013.01); *C08J 7/14* (2013.01); *C08K 5/23* (2013.01); *C08K 5/3445* (2013.01); *B05D 2350/60* (2013.01); *B05D 2502/005* (2013.01)

(58) Field of Classification Search
CPC ..... C08J 7/12; C08J 7/14; C08F 20/60; C08F 20/34; B05D 3/007; B05D 5/00; C09D 133/26
See application file for complete search history.

(56) References Cited

FOREIGN PATENT DOCUMENTS

| JP | 2008308659 | * 12/2008 |
|---|---|---|
| JP | 5437523 | 3/2014 |
| KR | 10-2017-0103296 | 9/2017 |
| KR | 20170103296 | * 9/2017 |

OTHER PUBLICATIONS

JP 2008 308659 machine translation (2008).*
Extended European Search Report dated Dec. 10, 2019 in European Patent Application No. 19185389.4.

* cited by examiner

*Primary Examiner* — Kuo Liang Peng
(74) *Attorney, Agent, or Firm* — Wenderoth, Lind & Ponack, L.L.P.

(57) ABSTRACT

An object is to provide a surface treatment liquid which can firmly bond, while coating the surface of a treatment target with an extremely thin film, a coating whose hydrophilicity is unlikely to be lowered even when the coating is brought into contact with fats and the like to the surface of the treatment target and a surface treatment method using the surface treatment liquid described above. In a surface treatment liquid containing a resin (A) and a solvent (S), as the resin (A), a resin is used which includes a constituent unit (a1) that includes an organic group including a quaternary ammonium cation group and having a sulfonic acid anion group at a terminal and that is derived from an N-substituted (meth) acrylamide, and includes a reactive silyl group in at least one of molecular chain terminals, the concentration of the resin (A) in the surface treatment liquid is less than 2 mass % and the pH of the surface treatment liquid is 4 or less.

20 Claims, No Drawings

SURFACE TREATMENT LIQUID AND HYDROPHILIC TREATMENT METHOD

This application is based on and claims the benefit of priority from Japanese Patent Application No. 2018-131059, filed on 10 Jul. 2018, the content of which is incorporated herein by reference.

BACKGROUND OF THE INVENTION

Field of the Invention

The present invention relates to a surface treatment liquid and a hydrophilic treatment method using the surface treatment liquid.

Related Art

Conventionally, in order to modify the properties of surfaces of various articles, various surface treatment liquids are used to perform hydrophilic treatment. In surface modification, there is a great demand for making the surfaces of articles hydrophilic, and thus a large number of agents and surface treatment liquids for making surfaces hydrophilic have been proposed.

Regarding the agents for surface treatment described above, for example, as a surface adjustment agent that can provide hydrophilicity and stain resistance to the surface of a coating, a surface adjustment agent has been proposed that contains a copolymer in which at least an acrylamide monomer and a mono(meth)acrylate monomer containing a siloxy group of a specific skeleton are copolymerized and the weight-average molecular weight of the copolymer is 1500 to 50000 (Patent Document 1)

Patent Document 1: Japanese Patent No. 5437523

SUMMARY OF THE INVENTION

Incidentally, the target of surface treatment is often an article, such as a microchannel device, in which projections and recesses having dimensions of about several nanometers to several tens of micrometers are provided on its surface. Disadvantageously, however, when such an article is subjected to surface treatment using the surface adjustment agent disclosed in Patent Document 1, fine concave portions may be embedded by the copolymer or the dimensions of the fine concave portions may be significantly narrowed.

For example, after surface treatment, the treated surface is rinsed with an organic solvent, and thus it is possible to greatly reduce the thickness of a film formed of a copolymer. Disadvantageously, however, in this case, since the extremely thin film formed of the copolymer is easily separated, the effect of the surface treatment is easily removed. The copolymer disclosed in Patent Document 1 indicates a certain degree of affinity to fats and the like. Hence, when the surface adjustment agent as disclosed in Patent Document 1 is used to perform surface treatment, after the surface treatment, the surface of a treatment target is contaminated with an organic substance which is unlikely to be dissolved in water, with the result that the hydrophilicity of the surface of the treatment target may be lowered.

The present invention is made in view of the problems described above, and an object thereof is to provide a surface treatment liquid which can firmly bond, while coating the surface of a treatment target with an extremely thin film, the coating whose hydrophilicity is unlikely to be lowered even when the coating is brought into contact with fats and the like, to the surface of the treatment target and a surface treatment method using the surface treatment liquid described above.

The present inventors have found that it is possible to solve the problems described above by adopting a configuration where in a surface treatment liquid containing a resin (A) and a solvent (S), the resin (A) includes a constituent unit (a1) which includes an organic group including a quaternary ammonium cation group and having a sulfonic acid anion group at a terminal (or an end) and is derived from an N-substituted (meth) acrylamide, where the resin including a reactive silyl group in at least one of molecular chain terminals is used, where the concentration of the resin (A) in the surface treatment liquid is less than 2 mass % and where the pH of the surface treatment liquid is 4 or less, and thereby have completed the present invention. More specifically, the present invention provides the following.

A first aspect of the present invention is a surface treatment liquid containing a resin (A) and a solvent (S), the resin (A) comprises a constituent unit (a1) comprising an organic group including a quaternary ammonium cation group and having a sulfonic acid anion group at a terminal and the unit (a1) being derived from an N-substituted (meth) acrylamide, in at least one of terminals of the main chain of the resin (A), a terminal group comprising a silanol group and/or a reactive silyl group having a group to generate a silanol group by hydrolysis is bonded, a ratio of the mass of the resin (A) to the mass of the surface treatment liquid is less than 2 mass % and the pH of the surface treatment liquid is 4 or less.

A second aspect of the present invention is a hydrophilic treatment method of making the surface of a treatment target hydrophilic, and the hydrophilic treatment method includes: forming a coating on the surface of the treatment target by applying the surface treatment liquid according to the first aspect.

The present invention is made in view of the problems described above, and it can provide a surface treatment liquid which can firmly bond, while coating the surface of a treatment target with an extremely thin film, the coating to the surface of the treatment target and a surface treatment method using the surface treatment liquid described above.

DETAILED DESCRIPTION OF THE INVENTION

<<Surface Treatment Liquid>>

A surface treatment liquid contains a resin (A) and a solvent (S) so as to make the surface of a treatment target hydrophilic. The resin (A) contained in the surface treatment liquid includes a constituent unit (a1) which includes an organic group including a quaternary ammonium cation group and having a sulfonic acid anion group at a terminal and is derived from an N-substituted (meth) acrylamide. In at least one of the molecular chain terminals of the resin (A), a terminal group which includes a silanol group and/or a reactive silyl group having a group to generate a silanol group by hydrolysis is bonded. A ratio of the mass of the resin (A) to the mass of the surface treatment liquid is less than 2 mass %. The pH of the surface treatment liquid is 4 or less.

When the resin (A) described above is used, the resin (A) can be covalently bonded to the surface of the treatment target by the reactive silyl group of the terminal. Hence, the surface treatment liquid described above is used to perform hydrophilic treatment on the surface of the treatment target, and thus an extremely thin coating can be formed which is firmly bonded to the surface of the treatment target and is unlikely to be separated by an external force such as friction. The resin (A) includes the constituent unit (a1) derived from the N-substituted (meth) acrylamide, and thus a hydrogen bond is formed between a carbonyl group in an amide bond and an amino group (—NH—). In this way, between a plurality of molecular chains in the resin (A), a reticulated network by hydrogen bonds is formed. By the formation of the network by hydrogen bonds, the mechanical strength of the coating itself is enhanced, and thus it can be considered that even when the coating on the surface of the treatment target receives friction or the like, the hydrophilicity is unlikely to be lowered by the separation of the coating. The resin (A) includes the constituent unit (a1) which includes the organic group including the quaternary ammonium cation group and having the sulfonic acid anion group at the terminal and is derived from the N-substituted (meth) acrylamide, and thus a high degree of hydrophilicity is provided to the surface of the treatment target where the coating is formed, and the coating whose hydrophilicity is unlikely to be lowered even when the coating is brought into contact with fats and the like is easily formed.

A ratio of the mass of the resin (A) to the mass of the surface treatment liquid is less than 2 mass %. The ratio of the mass of the resin (A) to the mass of the surface treatment liquid is so low that a thin coating whose film thickness is uniform is easily formed with the surface treatment liquid, and the self-condensation of the terminal groups in the resin (A) is easily prevented. The ratio of the mass of the resin (A) to the mass of the surface treatment liquid is preferably 0.1 mass % or more and less than 2 mass %, is more preferably 0.2 mass % or more and 1.8 mass % or less and is further preferably 0.5 mass % or more and 1.5 mass % or less.

The pH of the surface treatment liquid is 4 or less. The pH of the surface treatment liquid is 4 or less, and thus the resin (A) described above is satisfactorily and easily dissolved in the surface treatment liquid, with the result that the surface treatment liquid is easily stabilized over time. The pH of the surface treatment liquid is preferably 1 or more and 3 or less and is more preferably 1 or more and 2.5 or less. As the pH of the surface treatment liquid, a value which is measured at 20° C. is adopted.

The surface treatment liquid contains the resin (A) and the solvent (S) described above. In the following discussion, arbitrary ingredients, essential ingredients and the like of the surface treatment liquid will be described.

[Resin (A)]

The resin (A) includes the constituent unit (a1) which includes the organic group including a quaternary ammonium cation group and having a sulfonic acid anion group at the terminal and is derived from the N-substituted (meth) acrylamide. The resin (A) may include a constituent unit other than the constituent unit (a1) as long as the object of the present invention is not inhibited. The resin (A) includes the terminal group which includes the reactive silyl group in at least one of the molecular chain terminals.

In the following discussion, essential or arbitrary constituent units included in the resin (A) and the terminal group will be described.

(Constituent Unit (a1))

In order to provide hydrophilicity to the surface of the treatment target by the surface treatment, the resin (A) includes the constituent unit (a1) which includes the organic group including the quaternary ammonium cation group and having the sulfonic acid anion group at the terminal and is derived from the N-substituted (meth) acrylamide. The organic group including the quaternary ammonium cation group and having the sulfonic acid anion group at the terminal acts as a hydrophilic group in the resin (A).

In the N-substituted (meth) acrylamide providing the constituent unit (a1), the number of quaternary ammonium cation groups and the number of sulfonic acid anion groups are not particularly limited. In the N-substituted (meth) acrylamide providing the constituent unit (a1), the number of quaternary ammonium cation groups and the number of sulfonic acid anion groups are preferably the same as each other. Preferably, since the synthesis and availability of the N-substituted (meth) acrylamide providing the constituent unit (a1) are easy, the number of quaternary ammonium cation groups and the number of sulfonic acid anion groups in the N-substituted (meth) acrylamide providing the constituent unit (a1) are individually each one.

In the N-substituted (meth) acrylamide providing the constituent unit (a1), the quaternary ammonium cation group and the sulfonic acid anion group are present in a substituent which is bonded to a nitrogen atom in the (meth) acrylamide. In the substituent described above, the position of the quaternary ammonium cation group and the position of the sulfonic acid anion group are not particularly limited. For example, preferably, when the substituent described above is a branched chain group having 2 or more branched chains, in at least one of the branched chains, the quaternary ammonium cation group is present, and in at least one of the branched chains other than the branched chain where the quaternary ammonium cation group is present, the sulfonic acid anion group is present at the terminal of the branched chain. When the substituent described above is a linear chain, in an arbitrary position other than the terminal of a linear chain structure, the quaternary ammonium cation group is present, and at the terminal of the linear chain structure, the sulfonic acid anion group is present.

As the N-substituted (meth) acrylamide providing the constituent unit (a1) described above, a compound represented by formula (A1) below is preferable because of ease of the synthesis and availability thereof:

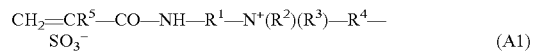

(A1)

(in formula (A1), $R^1$ and $R^4$ each independently represents a divalent hydrocarbon group which has 1 or more and 10 or less carbon atoms, $R^2$ and $R^3$ each independently represents a hydrocarbon group which may include a substituent and has 1 or more and 10 or less carbon atoms, and $R^5$ represents a hydrogen atom or a methyl group).

Examples of the divalent hydrocarbon group serving as $R^1$ and $R^4$ in formula (A1) include an alkylene group, an arylene group, and a group obtained by combining an alkylene group and an arylene group, and an alkylene group is preferable. Suitable specific examples of the alkylene group serving as $R^1$ and $R^4$ include a methylene group, an ethane-1,2-diyl group, a propane-1,3-diyl group, a propane-1,2-diyl group, a butane-1,4-diyl group, a pentane-1,5-diyl group, a hexane-1,6-diyl group, a heptane-1,7-diyl group, an octane-1,8-diyl group, a nonane-1,9-diyl group, and a decane-1,10-diyl group.

Examples of the hydrocarbon group serving as $R^2$ and $R^3$ in formula (A1) include an alkyl group, an aryl group, an aralkyl group, and the like, and an alkyl group is preferable. The hydrocarbon group serving as $R^2$ and $R^3$ may include a substituent. The substituent which may be included in the hydrocarbon group serving as $R^2$ and $R^3$ is not particularly limited as long as the object of the present invention is not inhibited. Examples of the substituent described above include a halogen atom, a hydroxyl group, an alkoxy group having 1 or more and 4 or less carbon atoms, an acyl group having 2 or more and 4 or less carbon atoms, an acyloxy group having 2 or more and 4 or less carbon atoms, an amino group, and an alkylamino group which is substituted with one or two alkyl groups having 1 or more and 4 or less carbon atoms. Suitable specific examples of the alkyl group serving as $R^2$ and $R^3$ include a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, an n-octyl group, a 2-ethylhexyl group, an n-nonyl group, and an n-decyl group.

Suitable examples of the N-substituted (meth) acrylarmide represented by formula (A1) include the compounds represented by the following formulas. In the following formulas, $R^5$ represents a hydrogen atom or a methyl group.

[Chem. 1]

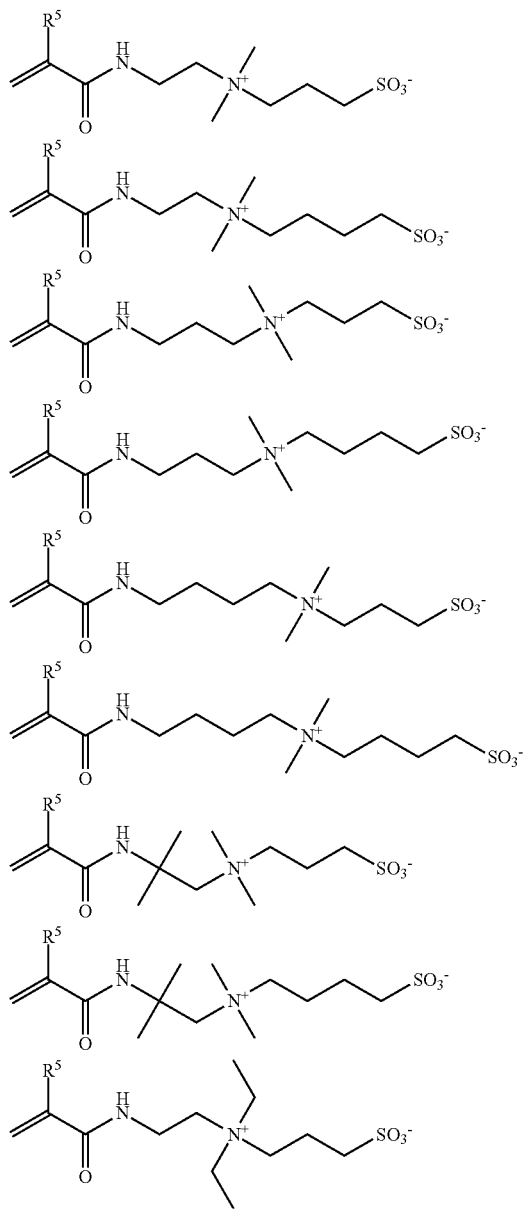
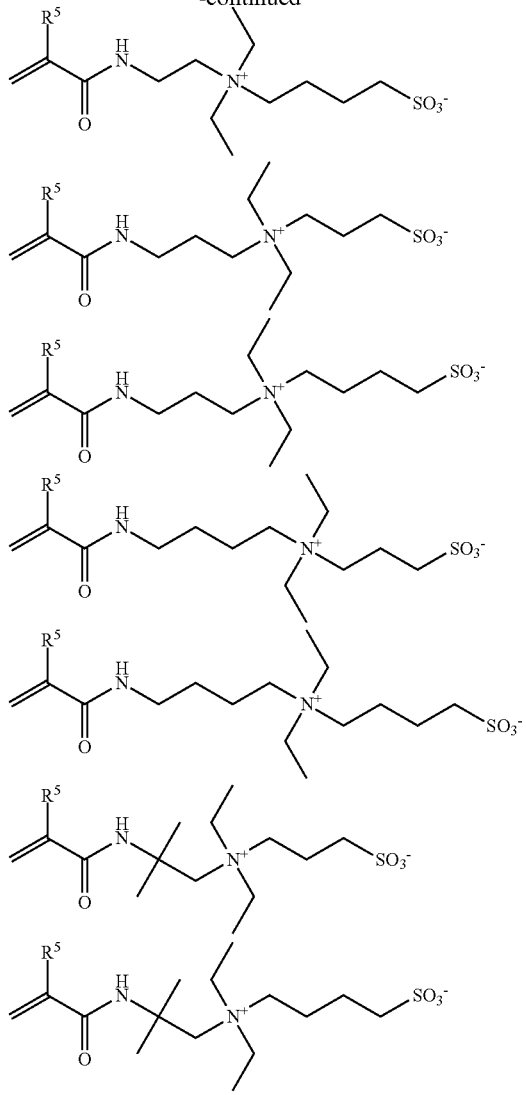

A ratio of the constituent unit (a1) to all of the constituent units of the resin (A) is not particularly limited as long as the object of the present invention is not inhibited. For example, the ratio of the constituent unit (a1) to all of the constituent units of the resin (A) is preferably 70 mol % or more. The ratio of the constituent unit (a1) to all of the constituent units of the resin (A) may be 80 mol % or more, may be 85 mol % or more, may be 90 mol % or more, may be 95 mol % or more, or may be 100 mol %. Although the ratio of the constituent unit (a1) described above is not particularly limited, examples thereof include 100 mol % or less.

(Constituent Unit (a2))

The resin (A) may include the constituent unit (a1) described above and a constituent unit (a2) which is a constituent unit other than the constituent unit (a1) and has a hydrophilic group. The constituent unit (a2) having the hydrophilic group is normally a constituent unit which is derived from a monomer compound having the hydrophilic group and an ethylenically unsaturated double bond.

The hydrophilic group described above is not particularly limited as long as it is generally recognized as a hydrophilic group by a person skilled in the art. Specific examples of the hydrophilic group include a primary amino group, a secondary amino group, a carboxy group, a phenolic hydroxyl group, a sulfonic acid group, polyoxyalkylene groups (for example, a polyoxyethylene group, a polyoxypropylene group, and a polyoxyalkylene group in which an oxyethylene group and an oxypropylene group are block-bonded or randomly bonded), an alcoholic hydroxyl group, and the like.

A cationic group formed with an anion moiety and a cation moiety that can be bonded to the resin (A) is also preferable as the hydrophilic group. Examples of the cation moiety constituting the cationic group include a nitrogen-containing cation moiety, a sulfur-containing cation moiety, an iodine-containing cation moiety, a phosphorus-containing cation moiety and the like.

Anions constituting the anion moiety are not particularly limited. The valency of the anion is not particularly limited, and a monovalent anion or a divalent anion is preferable, and a monovalent anion is more preferable. Suitable examples of the monovalent anion as the anion moiety include a halide ion, a hydroxide ion, a nitrate ion, various types of organic acid ions derived from organic carboxylic acid or organic sulfone acid, and the like. Among them, a halide ion is preferable, a chloride ion, bromide ion, an iodide ion, and a fluoride ion are more preferable, a chloride ion and a bromide ion are further preferable, and a chloride ion is particularly preferable.

Preferable examples of the cationic group include a group including a quaternary ammonium salt group, a group including a salt of a nitrogen-containing aromatic heterocyclic group, a group including a sulfonium salt group, a group including an iodonium salt group, a group including a phosphonium salt group, and the like. Among these cationic groups, the group including a quaternary ammonium salt group is preferable in terms of ease of introduction into the resin (A), a high hydrophilic effect, and the like.

As the quaternary ammonium salt group serving as the cationic group, a group represented by formula (I) below is preferable.

$$-R^{a14}-N^+R^{11}R^{12}R^{a13}\cdot X^-$$ (I)

(in formula (I), $R^{11}$, $R^{12}$, and $R^{13}$ are an alkyl group which is each independently bonded to $N^+$ and has 1 or more and 4 or less carbon atoms, two of $R^{11}$, $R^{12}$, and $R^{13}$ may be bonded to each other so as to form a ring, $R^{14}$ is an alkylene group which has 1 or more and 4 or less carbon atoms, and $X^-$ is a monovalent anion).

The alkyl group serving as $R^{11}$, $R^{12}$, and $R^{13}$ and having 1 or more and 4 or less carbon atoms may be linear or branched and is preferably linear. Suitable specific examples of $R^{11}$, $R^{12}$, and $R^{13}$ include a methyl group, an ethyl group, an n-propyl group, and an n-butyl group.

The alkylene group serving as $R^{14}$ and having 1 or more and 4 or less carbon atoms may be linear or branched and is preferably linear. Suitable specific examples of $R^{14}$ include a methylene group, an ethane-1,2-diyl group, a propane-1,3-diyl group and a butane-1,4-diyl group.

Suitable examples of $X^-$ are the same as those of the suitable examples of the anions constituting the anion moiety described above.

Examples of a monomer which provides the constituent unit (a2) include a (meth) acrylamide, an N-substituted (meth) acrylamide having a hydrophilic group, a (meth) acrylic ester having a hydrophilic group, and the like. As the N-substituted (meth) acrylamide having the hydrophilic group and the (meth) acrylic ester having the hydrophilic group, a compound represented by formula (A2) below is preferable:

$$CH_2=CR^{22}-CO-X-R^{21}$$ (A2)

(in formula (A2), $R^{21}$ represents an alkyl group which is substituted with one or more groups selected from a group consisting of an amino group, a sulfonic acid group, and a hydroxyl group and has 1 or more and 4 or less carbon atoms, $R^{22}$ represents a hydrogen atom or a methyl group, and X represents —O— or —NH—). Preferable examples of the (meth) acrylic ester having the hydrophilic group include mono(meth) acrylate of polyalkylene glycol such as polyethylene glycol or polypropylene glycol and (meth) acrylate of monoalkyl ether (such as methyl ether or ethyl ether) of polyalkylene glycol.

Suitable specific examples of $R^{21}$ include the following groups.

[Chem. 2]

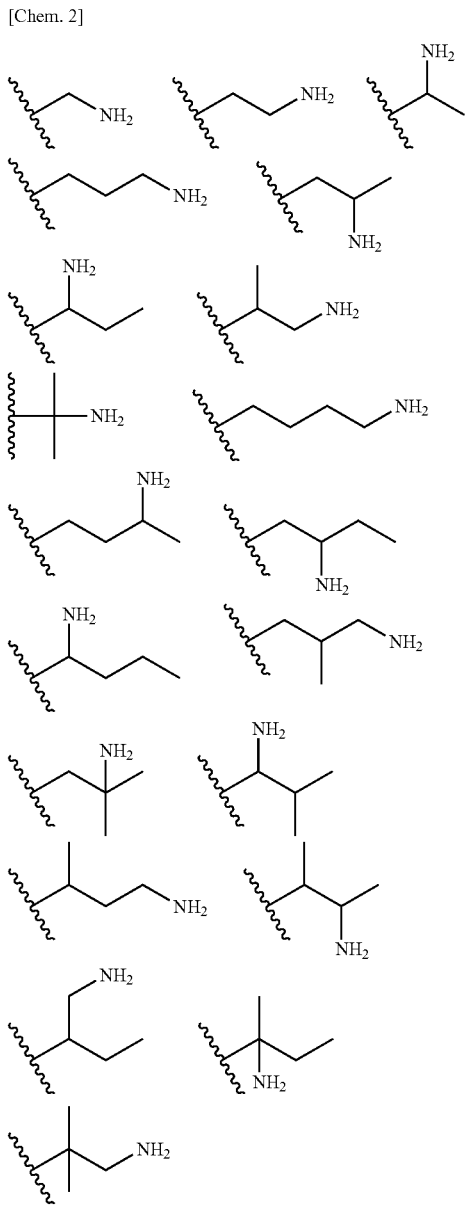

-continued

[Chem. 3]

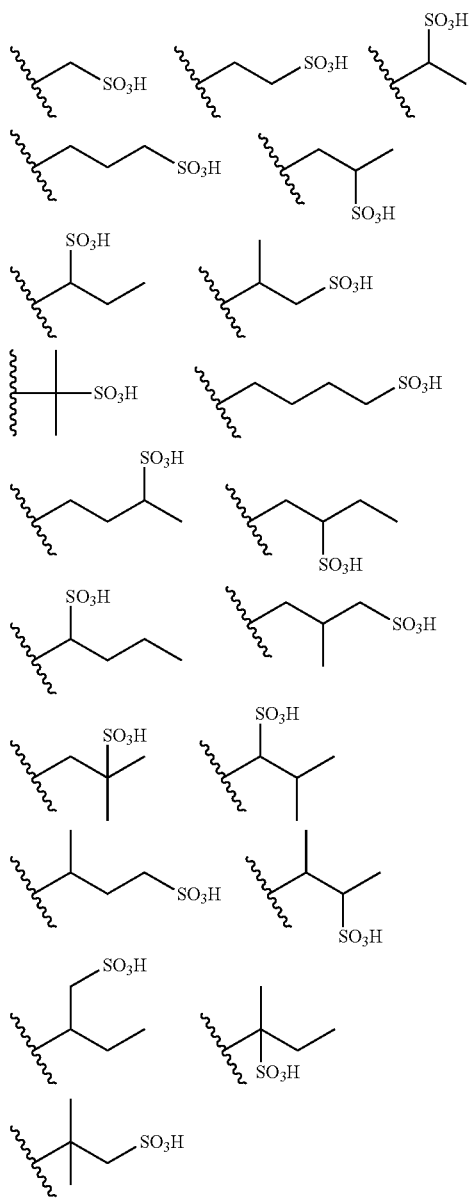

[Chem. 4]

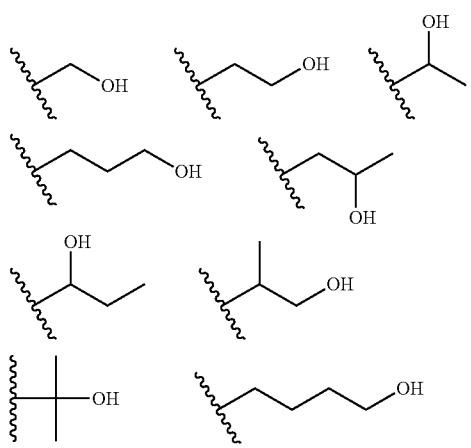

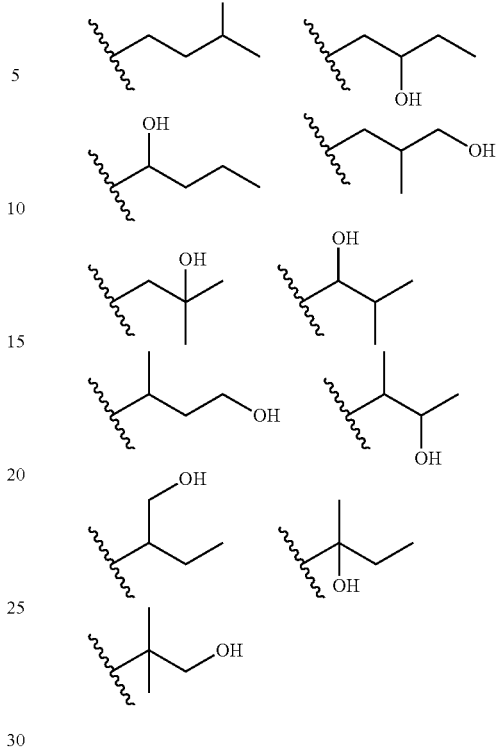

A ratio of the constituent unit (a2) to all of the constituent units of the resin (A) is not particularly limited as long as a desired surface treatment effect is obtained. For example, the ratio of the constituent unit (a2) to all of the constituent units of the resin (A) is preferably 0 mol % or more and 30 mol % or less and is more preferably 5 mol % or more and 15 mol % or less.

(Constituent Unit (a3))

The resin (A) may include another constituent unit (a3) other than the constituent unit (a1) and the constituent unit (a2) as long as the object of the present invention is not inhibited.

Examples of the other constituent unit (a3) include constituent units derived from monomers such as methyl (meth) acrylate, ethyl(meth)acrylate, isopropyl(meth) acrylate, n-propyl(meth) acrylate, n-butyl(meth)acrylate, isobutyl (meth)acrylate, n-pentyl(meth)acrylate, isopentyl(meth) acrylate, phenyl(meth)acrylate, N,N-dimethyl(meth)acrylamide, N,N-diethyl(meth)acrylamide, N,N-di-n-propyl (meth)acrylamide, N,N-di-n-butyl (meth)acrylamide, N,N-di-n-pentyl (meth) acrylamide, styrene, α-methyl styrene, β-methyl styrene, o-methyl styrene, m-methyl styrene, p-methyl styrene, and chlorostyrene.

A ratio of the other constituent unit (a3) to all of the constituent units of the resin (A) is not particularly limited as long as the desired surface treatment effect is obtained. The amount of other constituent unit (a3) with respect to all of the constituent units of the resin (A) is preferably the remaining amount obtained by subtracting the amount of constituent unit (a1) and the amount of constituent unit (a2) from the amount of all constituent units.

(Terminal Group)

In at least one of the molecular chain terminals of the resin (A), the terminal group which includes a silanol group and/or a reactive silyl group having a group to generate a silanol group by hydrolysis is bonded. Hence, the resin (A) reacts with the surface of the treatment target so as to form a covalent bond, and thus a coating is formed which is firmly bonded to the surface of the treatment target.

The terminal group includes one or more reactive silyl groups described above. As the reactive silyl group, a group represented by formula (II) below is preferable:

$$-\text{SiR}^{a2}_a \text{R}^{a3}_{3-a} \quad (II)$$

(in formula (II), $R^{a2}$ represents a hydroxyl group, an alkoxy group having 1 or more and 4 or less carbon atoms, or a halogen atom, $R^{a3}$ represents a hydrocarbon group which may include a substituent and has 1 or more and 10 or less carbon atoms, and a represents 2 or 3).

The reactive silyl group represented by formula (II) includes two or three silanol groups (hydroxyl groups) or groups (alkoxy groups and halogen atoms) which generate silanol groups by hydrolysis. Hence, when the surface treatment liquid which contains the resin (A) having the reactive silyl group represented by formula (II) described above is used to perform the surface treatment, not only does the reactive silyl group reacts with the surface of the treatment target, but also a condensation reaction occurs between the reactive silyl groups which are adjacently present on the surface of the treatment target. Consequently, in the coating, a network of siloxane bonds which is extended along the surface of the treatment target is formed, and thus a firm coating which is unlikely to be separated from the surface of the treatment target is easily formed.

Examples of the halogen atom serving as $R^{a2}$ include a chlorine atom, a bromine atom, an iodine atom, and the like, and a chlorine atom is preferable. Suitable examples of the alkoxy group serving as $R^{a2}$ include a methoxy group, an ethoxy group, an n-propyloxy group, an isopropyloxy group, and an n-butyloxy group, and a methoxy group and an ethoxy group are more preferable.

As the hydrocarbon group serving as $R^{a3}$, an alkyl group, an aralkyl group or an aryl group is preferable. When $R^{a3}$ is an alkyl group, the number of carbon atoms thereof is preferably 1 or more and 6 or less, is more preferably 1 or more and 4 or less, and is preferably 1 or 2. Suitable examples of the alkyl group when $R^{a3}$ is an alkyl group include a methyl group, an ethyl group, an n-propyl group, an isopropyl group, and an n-butyl group, and a methyl group and an ethyl group are more preferable. As the aralkyl group, a benzyl group and a phenethyl group are preferable. As the aryl group, a phenyl group, a naphthalen-1-yl group, and a naphthalen-2-yl group are preferable, and a phenyl group is more preferable.

As suitable examples of the reactive silyl group represented by formula (II) described above, a trimethoxysilyl group, a triethoxysilyl group, a tri-n-propyloxysilyl group, a methyldimethoxysilyl group, an ethyldimethoxysilyl group, a methyldiethoxysyl group, and an ethyldiethoxysilyl group are preferable, and a trimethoxysilyl group and a triethoxysilyl group are more preferable.

As the terminal group including the reactive silyl group represented by formula (II) described above, for example, in terms of ease of introduction into the resin (A), a group represented by formula (A-I) below is preferable:

$$-\text{S}-\text{R}^{a1}-\text{SiR}^{a2}_a \text{R}^{a3}_{3-a} \quad (A\text{-}I)$$

(in formula (A-I), $R^{a1}$ represents a divalent hydrocarbon group having 1 or more and 20 or less carbon atoms, and $R^{a2}$, $R^{a3}$, and a are respectively the same as $R^{a2}$, $R^{a3}$, and a in formula (II)).

The terminal group represented by formula (A-I) described above is introduced into the resin (A) by producing a so-called thiol-ene reaction between a mercapto compound represented by formula (A-II) below and a terminal vinyl group of a (meth)acrylic resin which essentially includes the constituent unit (a1) described above, which includes, as necessary, the constituent unit (a2) and/or the constituent unit (a3) and is included in the precursor of the resin (A):

$$\text{HS}-\text{R}^{a1}-\text{SiR}^{a2}_a \text{R}^{a3}_{3-a} \quad (A\text{-}II)$$

(in formula (A-II), $R^{a1}$ to $R^{a3}$ and a are respectively the same as $R^{a1}$ to $R^{a3}$ and a in formula (A-I)).

In formula (A-I) and formula (A-II) described above, the number of carbon atoms in the divalent hydrocarbon group serving as $R^{a1}$ is preferably 1 or more and 10 or less, is more preferably 1 or more and 6 or less, and is particularly preferably 2 or more and 4 or less. Examples of the divalent hydrocarbon group serving as $R^{a1}$ include an alkylene group, an arylene group, and a group obtained by combining an alkylene group and an arylene group, and an alkylene group is preferable. Suitable specific examples of the alkylene group serving as $R^{a1}$ include a methylene group, an ethane-1,2-diyl group, a propane-1,3-diyl group, a propane-1,2-diyl group, a butane-1,4-diyl group, a pentane-1,5-diyl group, a hexane-1,6-diyl group, a heptane-1,7-diyl group, an octane-1,8-diyl group, a nonane-1,9-diyl group, and a decane-1,10-diyl group.

Suitable examples of the mercapto compound represented by formula (A-II) include (2-mercaptoethyl) trimethoxysilane, (2-mercaptoethyl) triethoxysilane, (2-mercaptoethyl) methyldimethoxysilane, (2-mercaptoethyl) ethyldimethoxysilane, (2-mercaptoethyl) methyldiethoxysilane, (2-mercaptoethyl) ethyldiethoxysilane, (3-mercaptopropyl) trimethoxysilane, (3-mercaptopropyl) triethoxysilane, (3-mercaptopropyl) methyldimethoxysilane, (3-mercaptopropyl) ethyldimethoxysilane, (3-mercaptopropyl) methyldiethoxysilane, (3-mercaptopropyl) ethyldiethoxysilane, (4-mercaptobutyl) trimethoxysilane, (4-mercaptobutyl) triethoxysilane, (4-mercaptobutyl) methyldimethoxysilane, (4-mercaptobutyl) ethyldimethoxysilane, (4-mercaptobutyl) methyldiethoxysilane, and (4-mercaptobutyl) ethyldiethoxysilane.

The amount of terminal group including the reactive silyl group in the resin (A) is not particularly limited as long as the object of the present invention is not inhibited. In terms of reactivity of the resin (A) with the surface of the treatment target, the amount of the terminal group including the reactive silyl group in the resin (A) with respect to all of the constituent units of the resin (A) is preferably 0.1 mol % or more and 30 mol % or less, is more preferably 1 mol % or more and 20 mol % or less, and is further preferably 1 mol % or more and 10 mol % or less.

The resin (A) described above can be prepared by polymerizing, according to a known method, a monomer for providing the constituent unit (a1) and, as necessary, a monomer for providing the constituent unit (a2), and/or a monomer for providing the constituent unit (a3) and thereafter introducing, according to a known method, the terminal group including the reactive silyl group into the terminal of the obtained polymer.

<Electrolyte (B)>

The surface treatment liquid may contain an electrolyte (B). When the surface treatment liquid contains the electrolyte (B), the resin (A) is easily dissolved in the surface treatment liquid uniformly and stably. The electrolyte (B) is a substance other than the resin (A). The resin (A) which can be ionized in the surface treatment liquid is defined not as the electrolyte (B) but as the resin (A).

The type of electrolyte (B) is not particularly limited as long as the electrolyte (B) is not a substance which decomposes the resin (A). The type of electrolyte (B) is not particularly limited. The electrolyte (B) may be either a substance which is generally regarded as a strong electrolyte such as hydrochloric acid, sodium chloride, or potassium chloride or a substance which is generally regarded as a weak electrolyte such as an anionic surfactant (for example, sodium dodecyl sulfate) or a cationic surfactant (for example, benzalkonium chloride). However, since the pH of the surface treatment liquid is 4 or less, the content of the basic electrolyte such as sodium hydroxide or potassium hydroxide is limited to a small amount such that the pH of the surface treatment liquid is prevented from exceeding 4.

In terms of, for example, ease of availability and low cost, suitable examples of the electrolyte (B) include sodium chloride, potassium chloride, calcium chloride, magnesium chloride, magnesium sulfate, hydrochloric acid, sulfuric acid, nitric acid, and the like. Among these preferable electrolytes (B), acids such as hydrochloric acid, sulfuric acid, and nitric acid have an effect as a pH adjustment agent for adjusting the pH of the surface treatment liquid to 4 or less.

The content of the electrolyte (B) in the liquid is not particularly limited as long as the object of the present invention is not inhibited and it is determined as necessary with consideration given to solubility in the surface treatment liquid and the like. For example, the content of electrolyte (B) with respect to 100 parts by mass of the resin (A) is preferably 10 parts by mass or more and 200 parts by mass or less, is more preferably 50 parts by mass or more and 200 parts by mass or less, is further preferably 80 parts by mass or more and 200 parts by mass or less, and is particularly preferably 80 parts by mass or more and 150 parts by mass or less.

[Solvent (S)]

The surface treatment liquid contains the solvent (S). The solvent (S) may be water, an organic solvent, or an aqueous solution of an organic solvent. As the solvent (S), water is preferable in terms of the solubility of the resin (A), the safety and the cost reduction of the operation of the hydrophilic treatment, and the like. As a suitable example of the organic solvent used as the solvent (S), alcohol is mentioned. As the alcohol, an aliphatic alcohol is mentioned, and alcohol having 1 or more and 3 or less carbon atoms is preferable. Specific examples thereof include methanol, ethanol, n-propyl alcohol, and isopropyl alcohol (IPA), and methanol, ethanol, and isopropyl alcohol are preferable. One type or a combination of two or more types of alcohols described above may be used.

The content of water in the solvent (S) is preferably 80 mass % or more, is more preferably 90 mass % or more and is particularly preferably 100 mass %.

The surface treatment liquid can include an arbitrary polymerization initiator. As the polymerization initiator, for example, an azo polymerization initiator is mentioned. Examples of the polymerization initiator described above include 2,2'-azobis (2-methylpropionamidine) dihydrochloride (dihydrochloride), 2,2'-azobis [2-(phenylamidino) propane]dihydrochloride, 2,2'-azobis {2-[N-(4-chlorophenyl) amidino]propane} dihydrochloride, 2,2'-azobis {2-[N-(4-hydroxyphenyl) amidino] propane} dihydrochloride, 2,2'-azobis [2-(N-benzylamidino) propane] dihydrochloride, 2,2'-azobis [2-(N-allylamidino) propane] dihydrochloride, 2,2'-azobis (2-amidinopropane) dihydrochloride, 2,2'-azobis {2-[N-(4-hydroxyethyl) amidino] propane} dihydrochloride, 2,2-azobis [2-(5-methyl-2-imidazolin-2-yl) propane] dihydrochloride, 2,2-azobis [2-(2-imidazolin-2-yl) propane] dihydrochloride, 2,2-azobis [2-(4,5,6,7-tetrahydro-1H-1,3-diazepin-2-yl) propane]dihydrochloride, 2,2-azobis [2-(3,4,5,6-tetrahydropyrimidin-2-yl) propane] dihydrochloride, 2,2-azobis [2-(5-hydroxy-3,4,5,6-tetrahydropyrimidin-2-yl) propane] dihydrochloride, 2,2-azobis {2-[1-(2-hydroxyethyl)-2-imidazolin-2-yl] propane} dihydrochloride and 2,2-azobis [2-(2-imidazoline-2-yl) propane]. These polymerization initiators may be used singly, or two or more types thereof may be combined so as to be used. The content of the polymerization initiator in relation to the total mass of the resin (A), that is, 100 parts by mass, is preferably 0.01 to 3.0 parts by mass, is more preferably 0.05 to 2.0 parts by mass and is further preferably 0.1 to 1.0 parts by mass.

[Other Ingredients]

The surface treatment liquid may contain various additives as long as the object of the present invention is not inhibited. Examples of the additive described above include a thermal polymerization inhibitor, a photopolymerization inhibitor, an antioxidant, an ultraviolet light absorber, a coloring agent, an antifoaming agent, a viscosity adjustment agent, and the like. The contents of these additives in the liquid are determined as necessary with consideration given to the normally used amounts of these additives, <<Hydrophilic Treatment Method>>

A hydrophilic treatment method includes: forming the coating on the surface of the treatment target by applying the surface treatment liquid described above. Preferably, the hydrophilic treatment method further includes: rinsing the surface of the treatment target with a rinse liquid after the application of the surface treatment liquid.

In the following discussion, the application of the surface treatment liquid to the surface of the treatment target so as to form the coating is also referred to as the "coating step." The rinsing of the surface of the treatment target with the rinse liquid after the application of the surface treatment liquid is also referred to as the "rinse step," In the following discussion, the coating step, the rinse step and the surface treatment liquid will be described in detail.

<Coating Step>

In the coating step, the surface treatment liquid described above is applied to the surface of the treatment target so as to form the coating. A coating method is not particularly limited. Specific examples of the coating method include a spin coat method, a spray method, a roller coat method, an immersion method, and the like. When the treatment target is a substrate, since the coating having a uniform film thickness is evenly and easily formed on the surface of the substrate, the spin coat method is preferable as the coating method.

The material of the surface of the treatment target to which the surface treatment liquid is applied is not particularly limited and may be either an organic material or an inorganic material. Examples of the organic material include various resin materials such as polyester resins such as a PET resin and a PBT resin, various types of nylons, a polyimide resin, a polyamide-imide resin, polyolefins such as polyethylene and polypropylene, polystyrene, a (meth) acrylic resin, a cycloolefin polymer (COP), a cycloolefin copolymer (COC), and a silicone resin (for example, polyorganosiloxanes such as polydimethylsiloxane (PDMS). Photosensitive resin ingredients contained in various resist materials and alkali-soluble resin ingredients are also preferred as the organic material. Examples of the inorganic material include glass, silicon, and various metals such as copper, aluminum, iron and tungsten. The metals may be alloys.

Typically the resin (A) contained in the surface treatment liquid is often bonded by the reactive silyl group to a hydroxyl group on the surface of the treatment target. Hence, before the formation of the coating, in order to facilitate the satisfactory formation of a covalent bond between the resin (A) and the surface of the treatment target, treatment for introducing a hydroxyl group into the surface of the treatment target may be performed. As a suitable example of the treatment described above, plasma treatment with oxygen plasma, water vapor plasma, or the like is mentioned.

The shape of the treatment target is not particularly limited. The treatment target may be a flat substrate or may have, for example, a three-dimensional shape such as a spherical shape or a columnar shape. The surface of the treatment target may be smooth or may have regular or irregular projections and recesses. As the treatment target having regular or irregular projections and recesses, for example, a microchannel device is mentioned.

After the application of the surface treatment liquid to the surface of the treatment target by a known drying method, as necessary, at least part of the solvent may be removed from the coating formed of the surface treatment liquid.

The film thickness of the coating formed in the coating step is not particularly limited. For example, the film thickness of the coating formed in the coating step is preferably 50 nm or less, is more preferably 20 nm or less, and is further preferably 10 nm or less.

The thickness of the coating formed in the coating step can be adjusted by adjusting the concentration of the solid content of the surface treatment liquid, the coating conditions, and the like.

<Rinse Step>

In the rinse step, after the application of the surface treatment liquid, the surface of the treatment target is rinsed with the rinse liquid. By the rinsing, it is possible to reduce the thickness of the coating formed on the surface of the treatment target. The rinse liquid is not particularly limited as long as the coating having a desired film thickness can be formed. As the rinse liquid, water, an organic solvent, and an aqueous solution of an organic solvent can be used. As the rinse liquid, water is preferable. A method of rinsing the coating is not particularly limited. Typically, the rinse liquid is brought into contact with the coating by the same method as the coating method described above to perform the rinsing.

Before the rinsing is performed, part or the whole of the solvent (S) contained in the coating may be removed by heating of the coating. When the coating is heated, a reaction for forming a covalent bond between the resin (A) in the coating and the surface of the treatment target can be facilitated, and thus it is easy to more firmly bond the coating formed after the rinsing to the surface of the substrate. A heating temperature is not particularly limited as long as the treatment target and the resin (A) are prevented from being degraded or decomposed. As a typical heating temperature, a temperature which is about 50° C. or more and 200° C. or less is mentioned. A heating time is not particularly limited, and the heating time is, for example, 5 seconds or more and 1 hour or less and is preferably 10 seconds or more and 10 minutes or less.

For example, the film thickness of the coating obtained after the rinsing is preferably 10 nm or less, is more preferably 0.1 nm or more and 10 nm or less, is further preferably 0.1 nm or more and 8 nm or less, is yet more preferably 0.5 nm or more and 5 nm or less, and is particularly preferably 0.5 nm or more and 3 nm or less.

The thickness of the coating can be adjusted by adjusting the concentration of the solid content of the surface treatment liquid, the coating conditions, the amount of rinse liquid used, the type of rinse liquid, the temperature of the rinse liquid, and the like.

After the rinsing, the treatment target is dried as necessary, and thereafter the treatment target is suitably used for various applications.

EXAMPLES

Although the present invention will be more specifically described below using Examples, the scope of the present invention is not limited to these Examples.

Examples 1 to 4, Comparative Example 1, and Comparative Example 2

Monomers, polymerization initiators and mercapto compounds for terminal-group introduction of types and amounts described in table 1 were each individually added to the amounts of water described in table 1; thereafter, radical polymerization was performed at 80° C. for 4 hours and thus, as aqueous solutions or suspensions of resins, resin liquids 1 to 6 described in table 1 were obtained. The resin liquids of the types described in table 1 were diluted with water so as to have a concentration described in table 2 and electrolytes of the types described in table 2 were added so as to have a concentration described in table 2, and thus surface treatment liquids were obtained. Although in the surface treatment liquids of Examples and Comparative Examples, in a state after the dilution and before the addition of the electrolytes, the resins were precipitated, the liquids were changed to uniform solutions by the addition of the electrolytes. After being diluted, the surface treatment liquid of Comparative Example 1 was adjusted with NaOH so as to have a pH of 7.0.

Raw materials for resin synthesis described in table 1 are as follows. A-1: N-substituted acrylamide compound represented by the formula below

[Chem. 5]

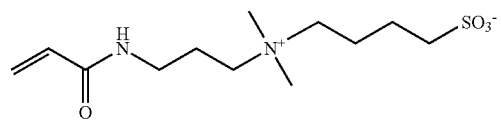

A-2: acrylamido
A-3: acrylic acid (polyethylene glycol) methyl ether (molecular weight: 480)
B-1: 2,2'-azobis [2-(2-imidazolin-2-yl) propane]
B-2: 2,2'-azobis (2-methylpropionamidine) dihydrochloride
C-1: (3-mercaptopropyl) trimethoxysilane
C-2: 2-aminoethanethiol The electrolytes described in table 1 are as follows.
D-1: sodium chloride
D-2: sulfuric acid The surface treatment liquids of Examples 1 to 4, Comparative Example 1, and Comparative Example 2 which were obtained were used, and thus the evaluations of hydrophilic treatment were performed according to the methods of evaluation 1, evaluation 2, and evaluation 3 below. The results of these evaluations are shown in table 2. In evaluation 1 and evaluation 2, since in the surface treatment liquid of Comparative Example 1, satisfactory hydrophilic treatment was not confirmed under a condition in which friction was not produced, the evaluation of the contact angle of water after friction was not performed. Since the results of evaluation 1 and evaluation 2 were not satisfactory, evaluation 3 was not performed for the surface treatment liquid of Comparative Example 1.

Evaluation 1

As a treatment target, a silicon wafer was used in which a natural oxide film on its surface was removed with a hydrofluoric acid aqueous solution. The silicon wafer was immersed in the surface treatment liquid at room temperature for one minute. The silicon wafer was lifted up from the surface treatment liquid and was thereafter subjected to heating treatment at 180° C. for 5 minutes. The silicon wafer was cooled to room temperature and was thereafter rinsed with pure water. The silicon wafer after being rinsed was dried, and thereafter the film thickness of a coating formed on the surface of the silicon wafer was measured by spectroscopic ellipsometry. Then, on the silicon wafer on which the treatment described above was performed and the silicon wafer on which, after the surface treatment, a 2 cm square of Scotch-Brite antibacterial urethane (made by 3M Corporation) was used to perform a scratch resistance test of 10 round trips with a load of 2 kg, the evaluations of the contact angle of water were performed according to the following method.

(Contact Angle Evaluation)

With a DropMaster 700 (made by Kyowa Interface Science Co., Ltd.), pure water droplets (2.0 μL) were dropped on the surface of the silicon wafer subjected to the surface treatment, and as contact angles 10 seconds after the dropping, contact angles of the water were measured. The average values of the contact angles of the water at three points on the silicon wafer are described in table 1.

Evaluation 2

The evaluations of the contact angles of water were performed in the same manner as in evaluation 1 except that the silicon wafer was lifted up from the surface treatment liquid, that thereafter the silicon wafer in a wet state with the surface treatment liquid was rinsed with pure water and that the silicon wafer was then dried by heating at 80° C. for 5 minutes.

Evaluation 3

In the same manner as in evaluation 1, the surface treatment of the silicon wafer was performed with the surface treatment liquid. The contact angle of water with the silicon wafer immediately after the surface treatment was measured in the same manner as in evaluation 1. Then, the silicon wafer on which the surface treatment was performed was immersed in oleic acid or n-decane at room temperature for 5 minutes. The surface of the silicon wafer lifted up from oleic acid or n-decane was subjected to air blowing, thus the oleic acid or n-decane was removed from the surface of the silicon wafer, and the silicon wafer was then washed with water and the evaluation of the contact angle of the water was performed in the same manner as in evaluation 1.

TABLE 1

| | | Resin liquid 1 | Resin liquid 2 | Resin liquid 3 | Resin liquid 4 | Resin liquid 5 | Resin liquid 6 |
|---|---|---|---|---|---|---|---|
| Monomer Upper section: Parts by mass Lower section: Ratio (mol %) | A-1 | 20 (100.0) | 20 (89.1) | 20 (89.8) | 17 (89.3) | 20 (100.0) | — |
| | A-2 | — | — | 0.55 (10.2) | — | — | 20 (100.0) |
| | A-3 | — | — | — | 3.35 (10.7) | — | — |
| Polymerization initiator (Parts by mass) | B-1 | — | — | — | — | 0.20 | — |
| | B-2 | 0.98 | 0.98 | 0.21 | 0.23 | — | 0.98 |
| Mercapto compound for terminal-group introduction (Parts by mass) | C-1 | 0.71 | 0.71 | 0.15 | 0.17 | — | 0.71 |
| | C-2 | — | — | — | — | 0.20 | — |
| Sulfuric acid (Parts by mass) | | 0.8 | 0.8 | 0.8 | 0.7 | — | 0.8 |
| Water (Parts by mass) | | 79.02 | 79.02 | 79.45 | 79.65 | 79.60 | 79.60 |

TABLE 2

| | | Example 1 | Example 2 | Example 3 | Example 4 | Comparative Example 1 | Comparative Example 2 |
|---|---|---|---|---|---|---|---|
| Surface treatment liquid | Resin liquid | Resin liquid 1 | Resin liquid 2 | Resin liquid 3 | Resin liquid 4 | Resin liquid 5 | Resin liquid 6 |
| | Concentration of resin (mass %) | 1 | 1 | 1 | 1 | 1 | 1 |
| | pH | 2.0 | 1.5 | 2.0 | 2.0 | 7.0 | 2.0 |
| | Type of electrolyte | D-1 | D-2 | D-1 | D-1 | D-1 | D-1 |
| | Concentration of electrolyte (mass %) | 0.8 | 0.8 | 0.8 | 0,8 | 0.8 | 0.8 |

TABLE 2-continued

| | | Example 1 | Example 2 | Example 3 | Example 4 | Comparative Example 1 | Comparative Example 2 |
|---|---|---|---|---|---|---|---|
| Evaluation 1 Rinsing after heating at 180° C. | Film thickness (nm) | 2 | 2 | 2 | 2 | — | 2 |
| | Contact angle of water (Initial) | <5° | <5° | <5° | <5° | 76° | <5° |
| | Contact angle of water (After friction) | <5° | <5° | <5° | <5° | — | <5° |
| Evaluation 2 Rinsing without heating | Film thickness (nm) | 2 | 2 | 2 | 2 | — | 2 |
| | Contact angle of water (Initial) | <5° | <5° | <5° | <5° | 76° | <5° |
| | Contact angle of water (After friction) | <5° | <5° | <5° | <5° | — | <5° |
| Evaluation 3 Stain resistance | Contact angle of water (Initial) | <5° | <5° | <5° | <5° | — | <5° |
| | Contact angle of water after immersion in oleic acid | <5° | <5° | <5° | <5° | — | 64.1° |
| | Contact angle of water after immersion in n-decane | <5° | <5° | <5° | <5° | — | 15.6° |

It is found from Examples 1 to 4 that when the surface treatment liquid which includes a resin (A) including: the constituent unit (a1) that includes an organic group including a quaternary ammonium cation group and having a sulfonic acid anion group at a terminal and that is derived from an N-substituted (meth) acrylamide; and a terminal group including a reactive silyl group, in which a ratio of the mass of the resin (A) to the mass of the surface treatment liquid is less than 2 mass % and in which the pH thereof is 4 or less is used, an extremely thin coating can be formed, and the surface of the treatment target can be made satisfactorily hydrophilic. It is found from evaluations 1 to 3 on the surface treatment liquids of Examples 1 to 4 that, when the surface treatment liquid which satisfies the predetermined requirements described above is used, even if the surface of the coating is rubbed or the treatment target after the surface treatment was brought into contact with fats and the like such as oleic acid or n-decane, the hydrophilic effect is not inhibited.

In the resin contained in the surface treatment liquid of Comparative Example 1, 2-aminoethanethiol was used so as to introduce the terminal group. Hence, the resin described above does not include the reactive silyl group in the terminal group. Thus, it is found that when the surface treatment liquid of Comparative Example 1 is used so as to perform the hydrophilic treatment, the coating is unlikely to adhere to the surface of the treatment target, and thus the desired hydrophilic effect is unlikely to be obtained in a state before the friction.

The surface treatment liquid of Comparative Example 2 contains the resin (A) which includes the terminal group including the reactive silyl group. Hence, as found from evaluation 1 and evaluation 2, the surface treatment liquid of Comparative Example 2 was used, and thus a coating that is excellent in durability against friction was formed. On the other hand, the resin (A) included in the surface treatment liquid of Comparative Example 2 does not include the constituent unit (a1) that includes the organic group including the quaternary ammonium cation group and having the sulfonic acid anion group at the terminal and is derived from the N-substituted (meth) acrylamide. Hence, the coating formed with the surface treatment liquid of Comparative Example 2 is easily lowered in hydrophilicity when being brought into contact with fats and the like such as oleic acid or n-decane.

What is claimed is:

1. A surface treatment liquid comprising a resin (A) and a solvent (S),
   wherein the resin (A) comprises a constituent unit (a1) comprising an organic group including a quaternary ammonium cation group and having a sulfonic acid anion group at a terminal and the unit (a1) being derived from an N-substituted (meth) acrylamide,
   in at least one of terminals of a main chain of the resin (A), a terminal group comprising a silanol group and/or a reactive silyl group having a group to generate a silanol group by hydrolysis is bonded,
   a ratio of a mass of the resin (A) to a mass of the surface treatment liquid is less than 2 mass %, and
   a pH of the surface treatment liquid is 4 or less.

2. The surface treatment liquid according to claim 1, wherein the constituent unit (a1) is a constituent unit derived from a monomer represented by formula (A1) below:

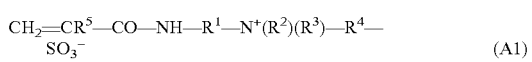
(A1)

(wherein in formula (A1), $R^1$ and $R^4$ each independently represents a divalent hydrocarbon group which has 1 or more and 10 or less carbon atoms, $R^2$ and $R^3$ each independently represents a hydrocarbon group which may include a substituent and has 1 or more and 10 or less carbon atoms and $R^5$ represents a hydrogen atom or a methyl group.

3. The surface treatment liquid according to claim 1, wherein the resin (A) comprises a constituent unit (a2) being a constituent unit other than the constituent unit (a1) and has a hydrophilic group.

4. The surface treatment liquid according to claim 3, wherein the constituent unit (a2) comprises at least one selected from the group consisting of acrylamide and acrylic acid (polyethylene glycol) methyl ether.

5. The surface treatment liquid according to claim 1, wherein a ratio of the constituent unit (a1) to all of the constituent units of the resin (A) is 70 mol % or more.

6. The surface treatment liquid according to claim 1, comprising an electrolyte (B).

7. The surface treatment liquid according to claim 6, wherein a content of the electrolyte (B) in the liquid is 10 parts by mass or more and 200 parts by mass or less with respect to 100 parts by mass of the resin (A).

8. The surface treatment liquid according to claim 7, wherein the content of the electrolyte (B) in the liquid is 80 parts by mass or more and 200 parts by mass or less with respect to 100 parts by mass of the resin (A).

9. The surface treatment liquid according to claim 6, wherein the electrolyte (B) comprises at least one selected from the group consisting of sodium chloride and sulfuric acid.

10. The surface treatment liquid according to claim 1, wherein the terminal group is a group represented by formula (A-I) below:

(wherein in formula (A-I), $R^{a1}$ represents a divalent hydrocarbon group having 1 or more and 20 or less carbon atoms, $R^{a2}$ represents a hydroxyl group, an alkoxy group having 1 or more and 4 or less carbon atoms, or a halogen atom, $R^{a3}$ represents a hydrocarbon group which may include a substituent and has 1 or more and 10 or less carbon atoms, and a represents or 3.

11. A hydrophilic treatment method of making a surface of a treatment target hydrophilic, the hydrophilic treatment method comprising: forming a coating on the surface of the treatment target by applying the surface treatment liquid according to claim 1.

12. The hydrophilic treatment method of making the surface of the treatment target hydrophilic according to claim 11, the hydrophilic treatment method comprising: rinsing the surface of the treatment target with a rinse liquid after the application of the surface treatment liquid.

13. The hydrophilic treatment method of making the surface of the treatment target hydrophilic according to claim 11, wherein a film thickness of the coating is 10 nm or less.

14. The surface treatment liquid according to claim 1, wherein the constituent unit (a1) comprises a constituent unit derived from a N-substituted acrylamide compound represented by the formula below:

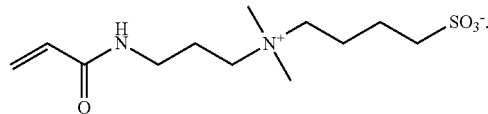

15. The surface treatment liquid according to claim 1, wherein the terminal group of the main chain of the resin (A) is derived from (3-mercaptopropyl) trimethoxysilane.

16. The surface treatment liquid according to claim 1, wherein the solvent (S) comprises water.

17. The surface treatment liquid according to claim 1, wherein the ratio of the mass of the resin (A) to the mass of the surface treatment liquid is 1 mass % or less.

18. The surface treatment liquid according to claim 1, wherein the pH of the surface treatment liquid is 1.5 or more and 2.0 or less.

19. The surface treatment liquid according to claim 1, wherein a ratio of the constituent unit (a1) to all of the constituent units of the resin (A) is 89.1 mol % or more and 100 mol % or less.

20. The surface treatment liquid according to claim 1, wherein the resin (A) comprises at least one selected from the group consisting of:

a homopolymer of a N-substituted acrylamide compound represented by the formula below:

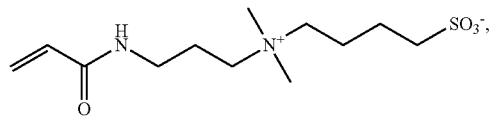

and a copolymer of the N-substituted acrylamide compound and at least one selected from the group consisting of acrylamide and acrylic acid (polyethylene glycol) methyl ether.

* * * * *